(12) United States Patent
Van Sickle (10) Patent No.: US 7,841,174 B2
(45) Date of Patent: Nov. 30, 2010

(54) PILOT BOSS FOR A TORQUE CONVERTER COVER AND METHOD OF FORMING THE SAME

(75) Inventor: Michael Van Sickle, Akron, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 403 days.

(21) Appl. No.: 12/001,841

(22) Filed: Dec. 13, 2007

(65) Prior Publication Data
US 2008/0149443 A1 Jun. 26, 2008

Related U.S. Application Data (60) Provisional application No. 60/876,216, filed on Dec. 21, 2006.

(51) Int. Cl.
F16H 41/24 (2006.01)
B21D 39/03 (2006.01)

(52) U.S. Cl. .......................................... 60/364; 60/330

(58) Field of Classification Search ................... 60/330, 60/364; 192/3.29
See application file for complete search history.

(56) References Cited

U.S. PATENT DOCUMENTS

| 4,257,229 | A | * | 3/1981 | LaBuda | ....................... 60/330 |
|---|---|---|---|---|---|
| 5,636,718 | A | * | 6/1997 | Nomoto et al. | ............. 192/3.29 |
| 5,813,505 | A | | 9/1998 | Olsen et al. | |
| 6,085,879 | A | | 7/2000 | Ebinger et al. | |
| 6,321,891 | B1 | | 11/2001 | Olsen et al. | |
| 6,474,062 | B1 | | 11/2002 | Yamanaka et al. | |
| 6,662,446 | B2 | * | 12/2003 | Yamanaka et al. | ......... 29/889.5 |
| 6,938,744 | B2 | | 9/2005 | Tomiyama | |
| 7,412,913 | B2 | * | 8/2008 | Ishikawa et al. | ............ 74/732.1 |

FOREIGN PATENT DOCUMENTS

JP 08042659 A * 2/1996

* cited by examiner

Primary Examiner—Thomas E Lazo
(74) Attorney, Agent, or Firm—Simpson & Simpson, PLLC (57) ABSTRACT

A torque converter cover including a protrusion extending from an outer surface of the torque converter cover and symmetrical about an axis of rotation for the cover and a pilot boss including a body having a recessed portion matingly engaged with the protrusion. In some embodiments, the protrusion is generally cylindrical, while in other embodiments, the recessed portion is generally cylindrical. A method of fixedly securing a pilot boss to a torque converter cover, the torque converter cover including a protrusion from an outer surface of the cover and symmetrical about an axis of rotation for the cover and a pilot boss including a body having a recessed portion, the method including the step of matingly engaging said recessed portion to the protrusion.

15 Claims, 7 Drawing Sheets

PILOT BOSS FOR A TORQUE CONVERTER COVER AND METHOD OF FORMING THE SAME

CROSS-REFERENCE TO RELATED APPLICATIONS

This patent application claims the benefit under 35 U.S.C. §119(e) of U.S. Provisional Application No. 60/876,216, filed Dec. 21, 2006, which application is incorporated herein by reference.

FIELD OF THE INVENTION

The invention broadly relates to torque converters, more specifically to torque converter covers, and even more particularly to a pilot boss for a torque converter cover and method of forming the same.

BACKGROUND OF THE INVENTION

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter, arranged between the engine and the transmission, includes three primary components: an impeller, sometimes referred to as a pump, directly connected to the converter's cover and thereby the engine's crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

Figure 1:
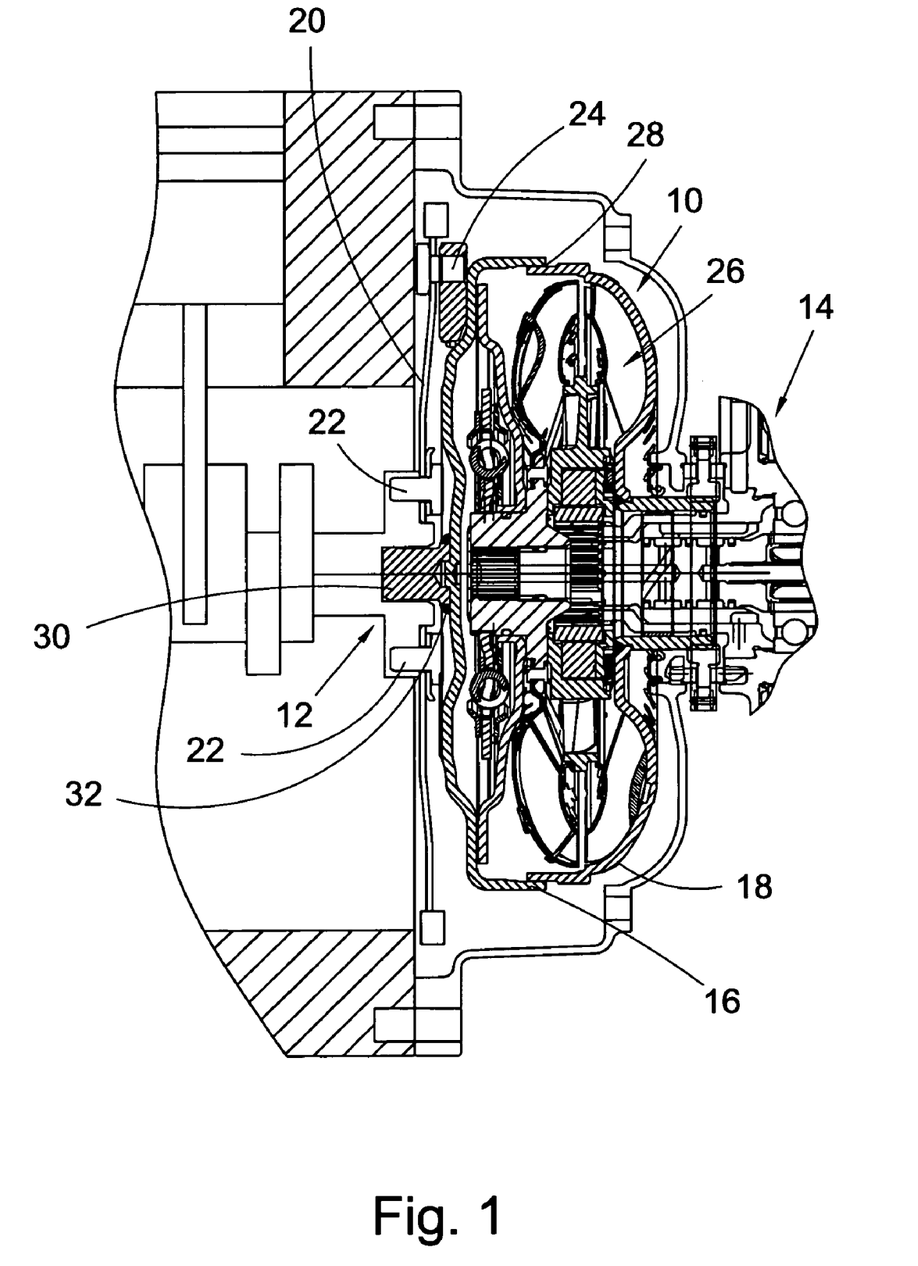
FIG. 1 is a cross-sectional view of a prior art torque converter, shown secured to an engine of a motor vehicle.

FIG. 1 is a cross sectional view of prior art torque converter 10 arranged between engine crankshaft 12 and transmission 14. As shown in FIG. 2, torque converters typically are enclosed by a two piece cover, i.e., front and back covers 16 and 18, respectively. Engine crankshaft 12 includes flexplate 20 fixedly secured thereto via bolts 22. Front cover 16 faces engine crankshaft 12 and is fixedly secured thereto via bolts 24, while back cover 18, which includes impeller 26, is proximate transmission 14 and fixedly secured to front cover 16 via weld 28. As can be seen in FIG. 1, in addition to bolts 24, front cover 16 often includes pilot boss 30 which helps align and hold torque converter 10 to engine crankshaft 12.

A variety of methods of incorporating a pilot boss are known in the art. For example, U.S. Pat. No. 6,474,062 issued on Nov. 5, 2002 to Yamanaka et al. teaches a method of producing a pilot boss by forming a torque converter cover with plastic working operations, e.g., stamping and rolling. Additionally, Yamanaka et al. describe an alternative method of incorporating a pilot boss in a torque converter, i.e., welding a flanged pilot within a through hole in the front cover. Other methods include welding a pilot to the front surface of the front cover. For example, as shown in FIG. 1, pilot boss 30 is fixedly secured to front cover 16 via weld 32. At times, when a pilot boss is formed via welding or stamping, secondary turning operations are necessary to correct for variability in manufacturing processes. In other words, a fully assembled torque converter cover must be corrected to meet required tolerances.

Thus, there is a long-felt need for a low cost means for and method of affixing a pilot boss to a torque converter cover. There also is a long-felt need for a simplified method of affixing a pilot boss to a torque converter cover which maintains tolerances and does not require secondary finishing operations after the cover with pilot boss is formed.

BRIEF SUMMARY OF THE INVENTION

The present invention broadly comprises a torque converter cover including a protrusion extending from an outer surface of the torque converter cover and symmetrical about an axis of rotation for the cover and a pilot boss including a body having a recessed portion matingly engaged with the protrusion. In various embodiments, the protrusion may be a cylinder, square parallelepiped, frustum, cone or paraboloid.

In a further embodiment, the torque converter cover includes a generally cylindrical protrusion extending from an outer surface of the torque converter cover and symmetrical about an axis of rotation for the cover and a pilot boss including a generally cylindrical body having a generally cylindrical recessed portion matingly engaged with the protrusion. In some embodiments, the pilot boss is matingly engaged with the protrusion by a compressive force, while in other embodiments, the recessed portion further includes at least one circumferential undercut. In some embodiments, the recessed portion includes an opening and the at least one circumferential undercut is continuous with the opening, while in other embodiments, the recessed portion includes a terminal end and the at least one circumferential undercut is continuous with the terminal end, and in yet other embodiments, the recessed portion includes an opening and a terminal end and the at least one circumferential undercut is between the opening and the terminal end.

In yet other embodiments, the protrusion includes a first diameter and the recessed portion includes a second diameter and the first diameter is greater than the second diameter, while in still yet other embodiments, the protrusion includes a first diameter and the recessed portion includes a second diameter and the first diameter is less than the second diameter. In other embodiments, the protrusion includes a height and the recessed portion includes a depth and the height is greater than the depth, while in still other embodiments, the protrusion includes a height and the recessed portion includes a depth and the height is less than the depth.

The present invention may also broadly comprise a torque converter cover including a first through hole arranged symmetrically about a first axis of rotation of the cover, a pilot including an outer wall and a terminal end, the terminal end including a second through hole arranged symmetrically about a second axis of rotation of the pilot and a fastener disposed within the first and second through holes operatively arranged to fixedly secure the pilot to the cover. In some embodiments, the pilot is generally cylindrical, while in other embodiments, the pilot is generally frustoconical. In yet other embodiments, the fastener is a rivet, while in still other embodiments, the fastener is a bolt.

The present invention may also broadly comprise a method of fixedly securing a pilot boss to a torque converter cover, the torque converter cover including a protrusion from an outer surface of the cover and symmetrical about an axis of rotation for the cover and a pilot boss including a body having a recessed portion, the method including the steps of: a) aligning the recessed portion with the protrusion; b) applying a compressive force to the pilot boss; and, c) deforming the protrusion within the recessed portion of the pilot boss. In some embodiments, the recessed portion further includes at least one circumferential undercut.

The present invention may further comprise a method of fixedly securing a pilot boss to a torque converter cover, the torque converter cover including a protrusion from an outer surface of the cover and symmetrical about an axis of rotation for the cover and a pilot boss including a body having a recessed portion, the method including the steps of: a) matingly engaging the recessed portion to the protrusion.

It is a general object of the present invention to provide a torque converter cover which includes a pilot matingly engaged thereto.

It is another general object of the present invention to provide a method of constructing a torque converter cover which includes a pilot matingly engaged thereto.

It is yet another object of the present invention to provide a low cost torque converter cover having a pilot matingly engaged thereto which is simple to manufacture and maintains assembly tolerance requirements without a need for secondary finishing operations.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "pilot" is synonymous with terms such as "pilot boss", and such terms may be used interchangeably as appearing in the specification and claims. Although any methods, devices or materials similar or equivalent to those described herein can be used in the practice or testing of the invention, the preferred methods, devices, and materials are now described.

Figures 2A, 2B:
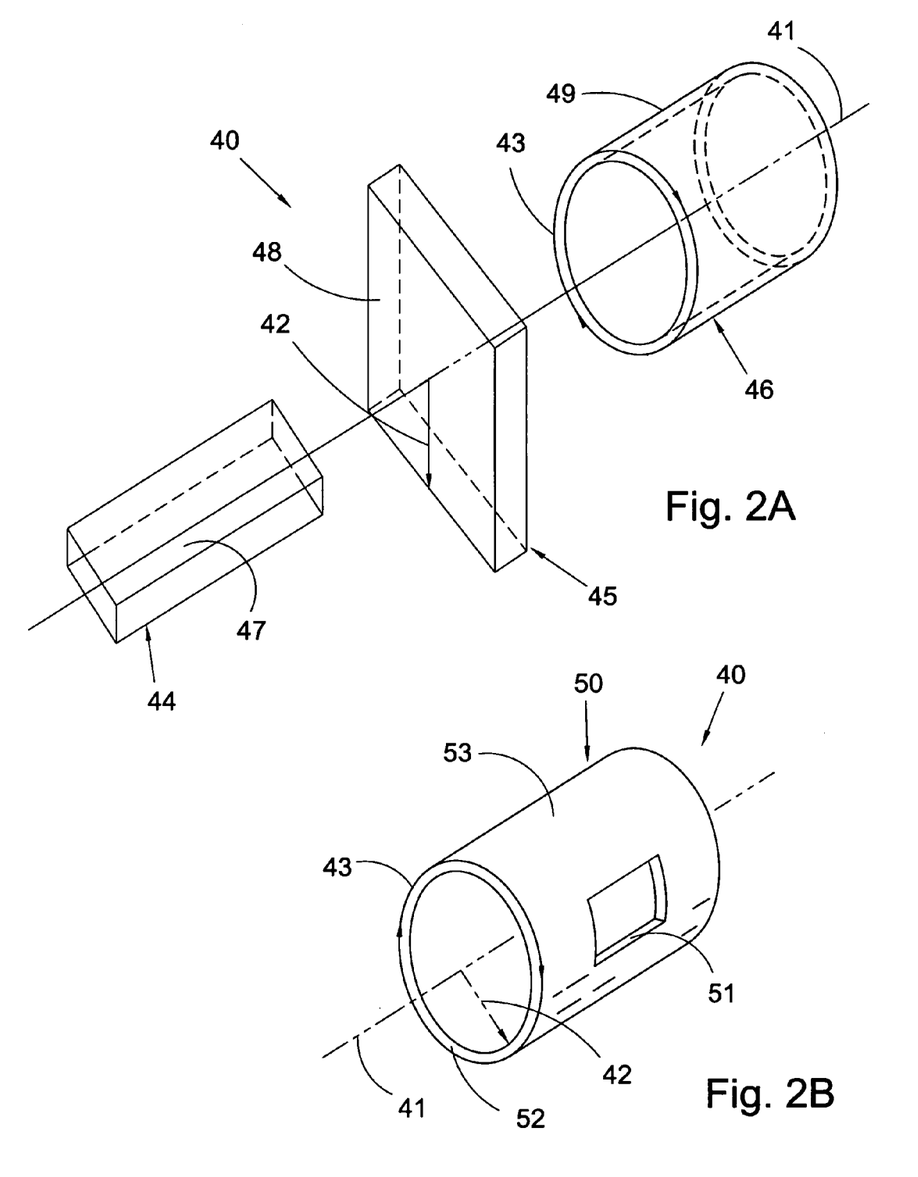
FIG. 2A is a perspective view of a cylindrical coordinate system demonstrating spatial terminology used in the present application.
FIG. 2B is a perspective view of an object in the cylindrical coordinate system of FIG. 2A demonstrating spatial terminology used in the present application.

FIG. 2A is a perspective view of cylindrical coordinate system 40 demonstrating spatial terminology used in the present application. The present invention is at least partially described within the context of a cylindrical coordinate system. System 40 has a longitudinal axis 41, used as the reference for the directional and spatial terms that follow. The adjectives "axial," "radial," and "circumferential" are with respect to an orientation parallel to axis 41, radius 42 (which is orthogonal to axis 41), and circumference 43, respectively. The adjectives "axial," "radial" and "circumferential" also are regarding orientation parallel to respective planes. To clarify the disposition of the various planes, objects 44, 45, and 46 are used. Surface 47 of object 44 forms an axial plane. That is, axis 41 forms a line along the surface. Surface 48 of object 45 forms a radial plane. That is, radius 42 forms a line along the surface. Surface 49 of object 46 forms a circumferential plane. That is, circumference 43 forms a line along the surface. As a further example, axial movement or disposition is parallel to axis 41, radial movement or disposition is parallel to radius 42, and circumferential movement or disposition is parallel to circumference 43. Rotation is with respect to axis 41.

The adverbs "axially," "radially," and "circumferentially" are with respect to an orientation parallel to axis 41, radius 42, or circumference 43, respectively. The adverbs "axially," "radially," and "circumferentially" also are regarding orientation parallel to respective planes.

FIG. 2B is a perspective view of object 50 in cylindrical coordinate system 40 of FIG. 2A demonstrating spatial terminology used in the present application. Cylindrical object 50 is representative of a cylindrical object in a cylindrical coordinate system and is not intended to limit the present invention is any manner. Object 50 includes axial surface 51, radial surface 52, and circumferential surface 53. Surface 51 is part of an axial plane, surface 52 is part of a radial plane, and surface 53 is part of a circumferential plane.

Figure 3:
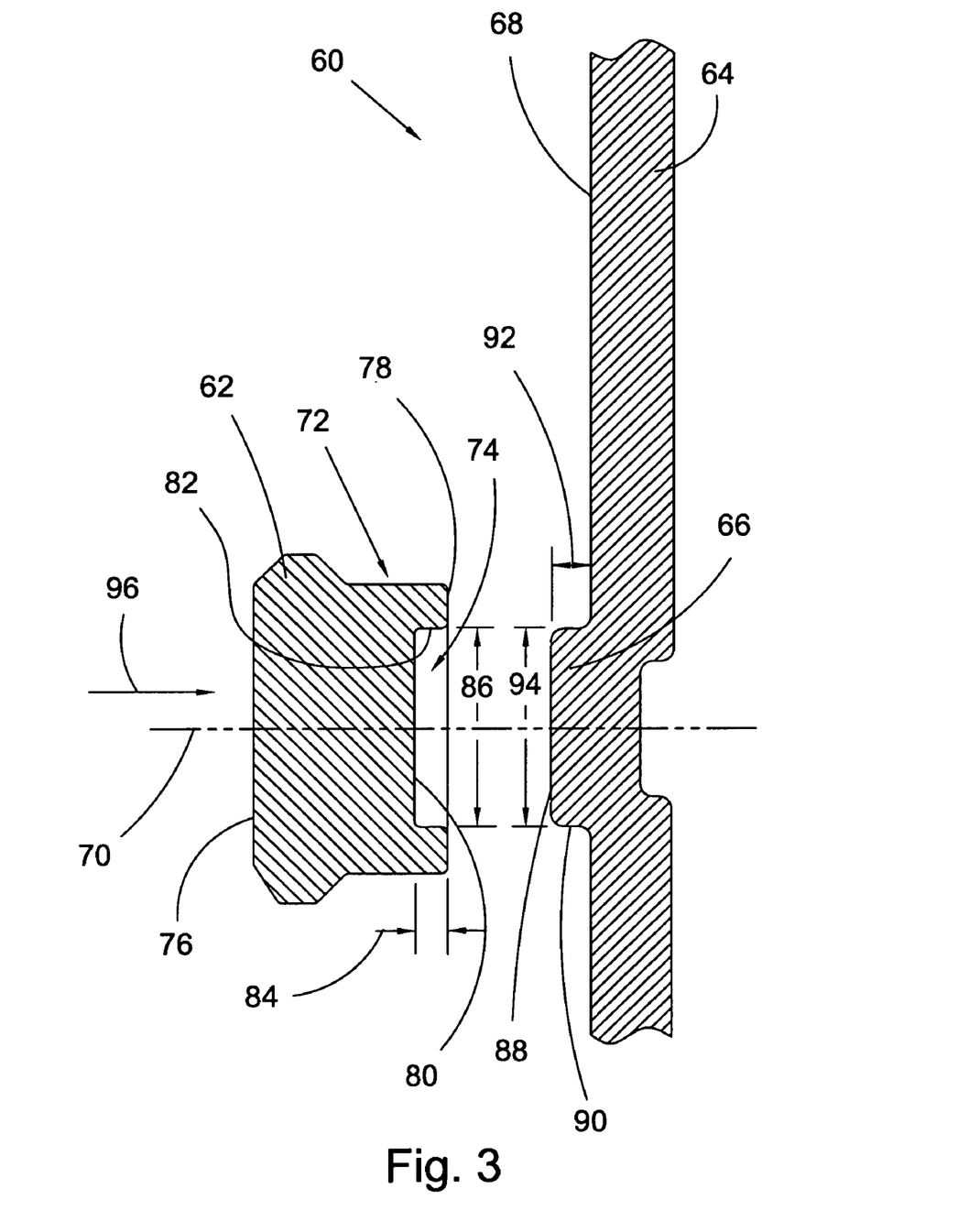
FIG. 3 is a partial cross sectional view of a present invention torque converter front cover having a pilot boss removed.
Figure 4:
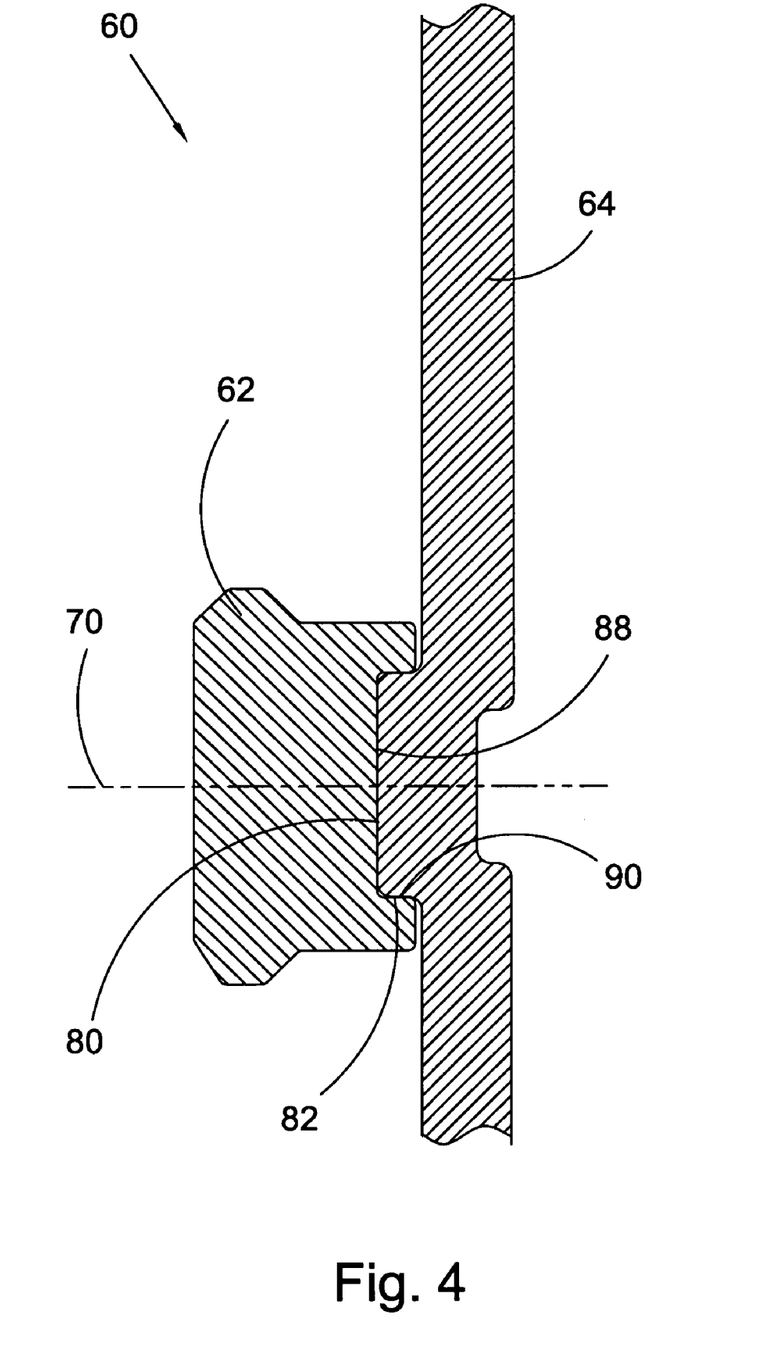
FIG. 4 is a partial cross sectional view of a present invention torque converter front cover having a pilot boss matingly engaged with the cover.

FIG. 3 is a partial cross sectional view of present invention torque converter front cover 60 having pilot 62 removed, while FIG. 4 is a partial cross sectional view of present invention torque converter front cover 60 having pilot 62 matingly engaged with cover 64. The following discussion is best understood in view of the embodiments shown in FIGS. 3 and 4. Torque converter front cover 60 includes protrusion 66 extending from outer surface 68 of front cover 64 and symmetrical about axis of rotation 70 for front cover 64 and pilot boss 62 which includes body portion 72 having recessed portion 74 matingly engaged with protrusion 66. Although in the embodiments shown in FIGS. 3 and 4, pilot boss 62, protrusion 66 and recessed portion 74 are generally cylindrical in shape, one of ordinary skill in the art will recognize that other shapes are also possible, e.g., square parallelepiped, frustum, cone and paraboloid, and such shapes are within the spirit and scope of the claimed invention.

In some embodiments, e.g., the embodiments shown in FIGS. 3 and 4, pilot boss 62 is arranged to be matingly engaged with protrusion 66 by a compressive force. In these embodiments, pilot boss 62 includes terminal and open ends 76 and 78, respectively, and recessed portion 74 is located proximate open end 78. Recessed portion 74 includes bottom wall 80 and side wall 82, the locations of which define depth 84 and diameter 86. Similarly, protrusion 66 includes top surface 88 and side wall 90, the locations of which define height 92 and diameter 94. Thus, by applying a compressive force in the direction of arrow 96, pilot boss 62 may be matingly engaged with protrusion 66.

In various embodiments, diameter 94 of protrusion 66 is less than diameter 86 of recessed portion 74. In such embodiments, application of the above-described compressive force causes recessed portion 74 to pass over protrusion 66 until either bottom wall 80 and top surface 88 contact each other, i.e., height 92 is greater than depth 84, or open end 78 and outer surface 68 contact each other, i.e., height 92 is less than depth 84. In the embodiments where bottom wall 80 and top surface 88 contact each other, provided sufficient compressive force is applied, diameter 94 of protrusion 66 is caused to expand, thereby matingly engaging pilot boss 62 with protrusion 66. In the embodiments where open end 78 and outer surface 68 contact each other, provided sufficient compressive force is applied, the expansion of side wall 82 causes diameter 86 of recessed portion 74 to decrease, thereby matingly engaging pilot boss 62 with protrusion 66.

In other embodiments, diameter 94 of protrusion 66 is greater than diameter 86 of recessed portion 74. In such embodiments, application of the above-described compressive force causes recessed portion 74 to pass over protrusion 66 until either bottom wall 80 and top surface 88 contact each other, i.e., height 92 is greater than depth 84, open end 78 and outer surface 68 contact each other, i.e., height 92 is less than depth 84, or the frictional engagement of side walls 82 and 90 is sufficient for mating engagement of pilot boss 62 with protrusion 66, i.e., neither bottom wall 80 and top surface 88 contact each other nor open end 78 and outer surface 68 contact each other. In the embodiments where bottom wall 80 and top surface 88 contact each other, provided sufficient compressive force is applied, diameter 94 of protrusion 66 is caused to expand, thereby matingly engaging pilot boss 62 with protrusion 66. In the embodiments where open end 78 and outer surface 68 contact each other, provided sufficient compressive force is applied, the expansion of side wall 82 causes diameter 86 of recessed portion 74 to decrease, thereby matingly engaging pilot boss 62 with protrusion 66. In the embodiments where the frictional engagement of side walls 82 and 90 is sufficient for the given use, it is this frictional engagement alone which matingly engages pilot 62 with protrusion 66.

Figure 5:
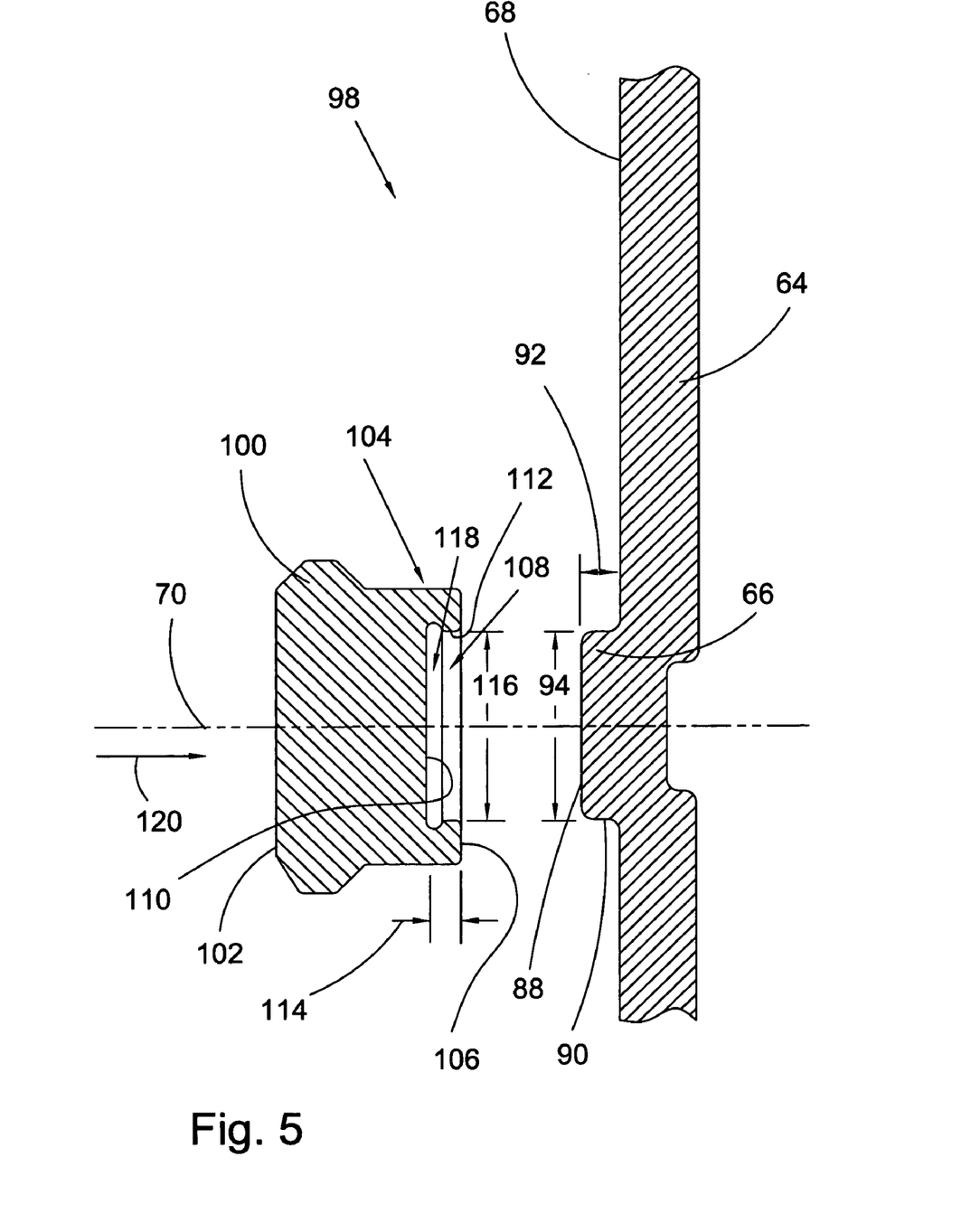
FIG. 5 is a partial cross sectional view of another embodiment of a present invention torque converter front cover having a pilot boss removed.

FIG. 5 is a partial cross sectional view of another embodiment of a present invention torque converter front cover 98 having pilot boss 100 removed. As in the embodiments described above, torque converter front cover 98 includes cover 64 having outer surface 68 and protrusion 66 extending from outer surface 68 and symmetrical about axis of rotation 70 for front cover 98. Similarly, as described supra, protrusion 66 includes top surface 88 and side wall 90, the locations of which define height 92 and diameter 94, and in this embodiment, form a generally cylindrical shape. Pilot boss 100 includes terminal end 102 and body portion 104 which includes open end 106 having recessed portion 108 therein. Recessed portion 108 includes bottom wall 110 and side wall 112, the locations of which define depth 114 and diameter 116. Side wall 112 further includes undercut 118. In this embodiment, by applying a compressive force in the direction of arrow 120, pilot boss 100 is matingly engaged with protrusion 66. Similar to several embodiments described above, as recessed portion 108 of pilot boss 100 is compressed against protrusion 66 and/or outer surface 68, side wall 90 of protrusion 66 and/or side wall 112 expands to matingly engage pilot boss 100 with protrusion 66. However, in this embodiment, undercut 118 provides additional volume for protrusion 66 to expand within during application of sufficient compressive force in the direction of arrow 120. Thus, as opposed to merely having contact between side walls 90 and 112, in this embodiment, pilot boss 100 is in part matingly engaged to protrusion 66 due to the expansion of protrusion 66 within undercut 118.

Figure 6:
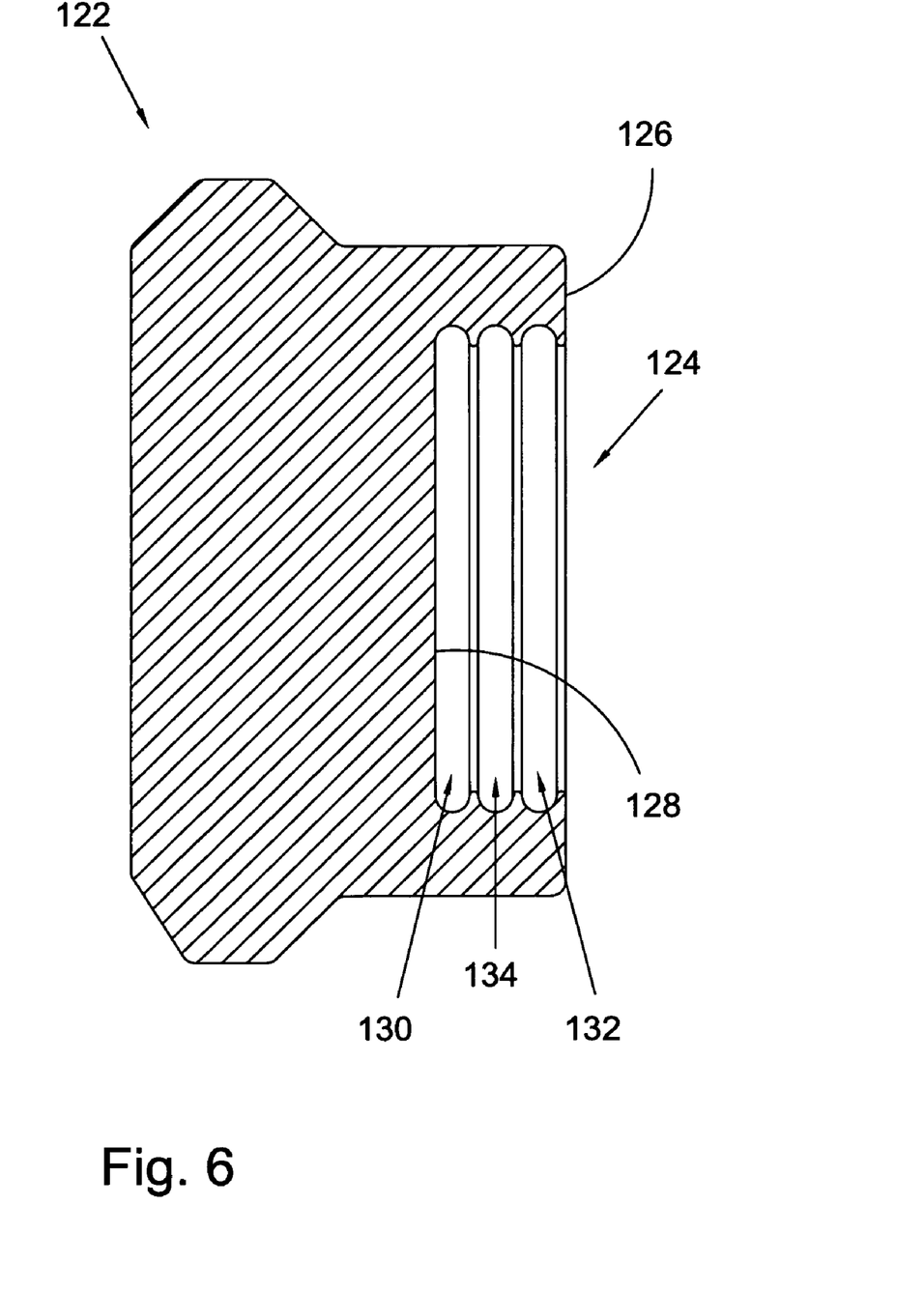
FIG. 6 is a cross sectional view of an embodiment of a present invention torque converter pilot boss having a recessed portion which includes a plurality of circumferential undercuts therein; and, FIG. 7 is a partial cross sectional exploded view of yet another embodiment of a present invention torque converter cover having a pilot boss removed.

FIG. 6 is a cross sectional view of an embodiment of present invention torque converter pilot boss 122 having recessed portion 124 which includes a plurality of circumferential undercuts therein. Pilot boss 122 further includes open end 126, while recessed portion 124 includes terminal end 128. In this embodiment, recessed portion 124 includes first undercut 130 continuous with terminal end 128, second undercut 132 continuous with open end 126 and third undercut 134 disposed between first and second undercuts 130 and 132, respectively, and thereby between terminal and open ends 128 and 126, respectively. Although the embodiment shown in FIG. 6 depicts pilot boss 122 having first, second and third undercuts 130, 132 and 134, respectively, one of ordinary skill in the art will recognize that any combination of undercuts is possible, e.g., first, first/second, first/third, second, second/third, and third, and such variations are within the spirit and scope of the claimed invention. Additionally, it is within the scope of the claimed invention to include more than three circumferential undercuts or to include surface features arranged to enhance the mating engagement between a pilot boss and a cover, e.g., a threaded bore.

Figure 7:
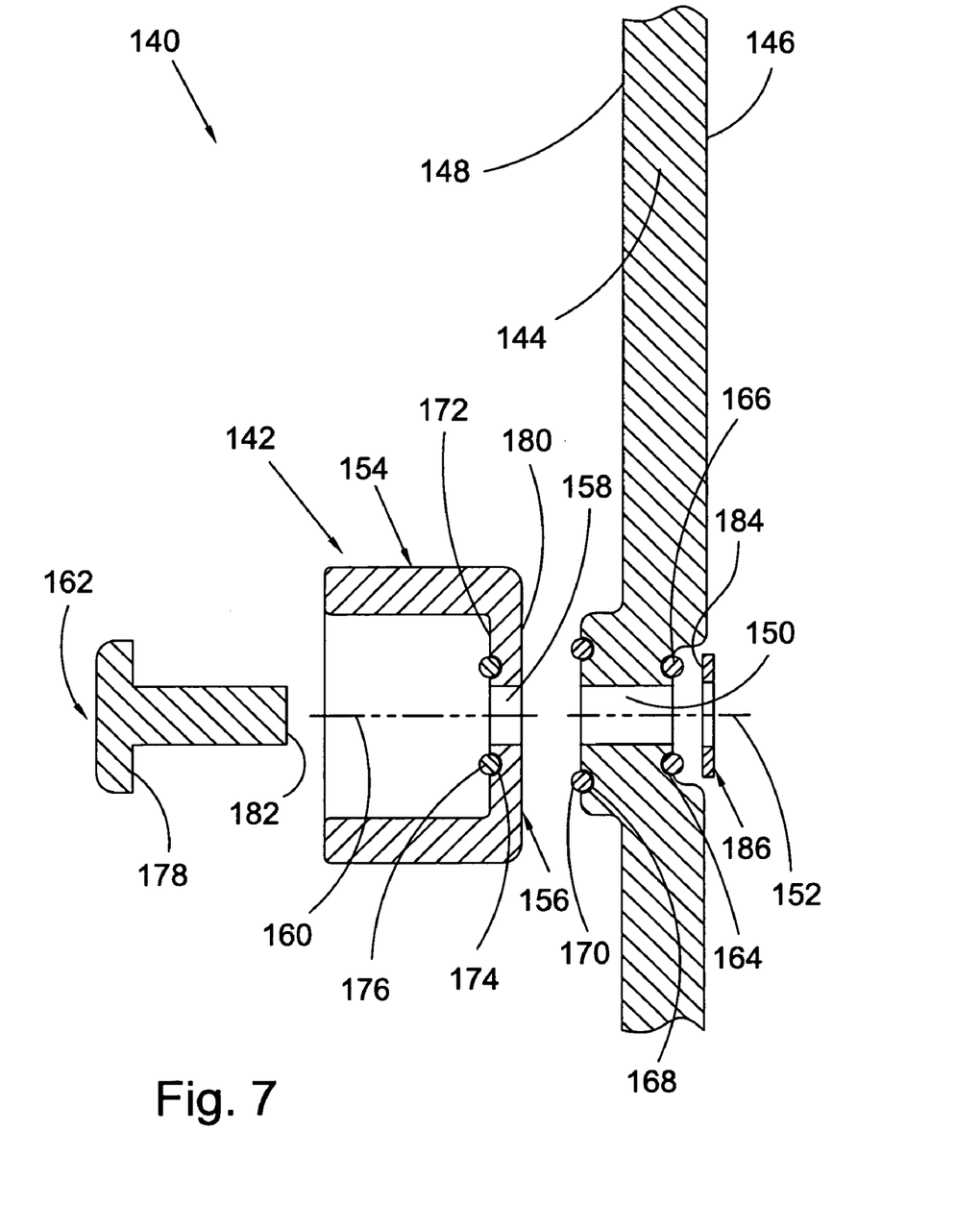

FIG. 7 is a partial cross sectional exploded view of yet another embodiment of present invention torque converter front cover 140 having pilot boss 142 removed. In this embodiment, torque converter front cover 140 includes cover 144 having inner and outer surfaces 146 and 148, respectively, and first through hole 150 arranged symmetrically about first axis of rotation 152 of cover 144. Torque converter front cover 140 further includes pilot 142 having an outer wall 154 and terminal end 156 which includes second through hole 158 arranged symmetrically about second axis of rotation 160 of pilot boss 142 and fastener 162 disposed within first and second through holes 150 and 158, respectively, and operatively arranged to fixedly secure pilot boss 142 to cover 144. Although the embodiment shown in FIG. 7 depicts pilot boss 142 as generally cylindrical, one of ordinary skill in the art will recognize that other pilot boss shapes are also possible, e.g., frustoconical or paraboloid, and such variations are within the spirit and scope of the claimed invention. Additionally, although pilot boss 142 is shown secured to cover 144 via rivet 162, other fastening means are also possible, e.g., bolts, and such variations are within the spirit and scope of the claimed invention.

As one of ordinary skill in the art appreciates, during operation, torque converters enclose a pressurized fluid, and therefore must be sealed to prevent such fluids from escaping the sealed converter enclosure. Hence, in the embodiment shown in FIG. 7, torque converter front cover 140 further includes at least one sealing means arranged to prevent egress of fluid through first and second through holes 150 and 158, respectively. Inner surface 146 of cover 144 includes first radial groove 164 wherein first o-ring 166 is positioned. Similarly, outer surface 148 of cover 144 includes second radial groove 168 wherein second o-ring 170 is positioned, while inner surface 172 of pilot boss 142 includes third radial groove 174 wherein third o-ring 176 is positioned. Accordingly, upon installation of rivet 162, torque converter front cover 140 is sealed as sealing surface 178 of rivet 162 compresses third o-ring 176, outer surface 180 of terminal end 156 compresses second o-ring 170 and terminal end 182 of rivet 162 is formed into a rivet head (not shown) thereby compressing inner surface 184 of sealing washer 186 against first o-ring 166. Thus, when torque converter front cover 140 is assembled according to the foregoing arrangement, egress of pressurized fluid in a sealed torque converter is prevented from occurring through first and second through holes 150 and 158, respectively. Although the embodiment shown in FIG. 7 depicts the combination of three o-rings, i.e., o-rings, 166, 170 and 176, one of ordinary skill in the art will recognize that other arrangements are also possible, e.g., use of RTV sealants or brazing the pilot to the cover, and such arrangements are within the spirit and scope of the claimed invention.

In view of the figures and description above, one of ordinary skill in the art will recognize that the present invention also broadly comprises a method of fixedly securing a pilot boss to a torque converter cover, the torque converter cover including a protrusion from an outer surface of the cover and symmetrical about an axis of rotation for the cover and a pilot boss including a body having a recessed portion, the method including the steps of: a) aligning the recessed portion with the protrusion; b) applying a compressive force to the pilot boss; and, c) deforming the protrusion within the recessed portion of the pilot boss. Similar to the embodiments described above, the recessed portion may further include at least one circumferential undercut.

In yet another embodiment, the present invention may broadly comprise a method of fixedly securing a pilot boss to a torque converter cover, the torque converter cover including a protrusion from an outer surface of the cover and symmetrical about an axis of rotation for the cover and a pilot boss including a body having a recessed portion, the method including the step of matingly engaging the recessed portion with the protrusion.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A torque converter cover comprising:
a generally cylindrical protrusion extending from an outer surface of said torque converter cover and symmetrical about an axis of rotation for said cover; and, a pilot boss comprising a generally cylindrical body having a generally cylindrical recessed portion matingly engaged with said protrusion, wherein said protrusion comprises a first diameter and said recessed portion comprises a second diameter, said first diameter is greater than said second diameter.

2. The torque converter cover of claim 1 wherein said pilot boss is matingly engaged with said protrusion by a compressive force.

3. The torque converter cover of claim 1 wherein said recessed portion further comprises at least one circumferential undercut.

4. The torque converter cover of claim 3 wherein said recessed portion comprises an opening, said at least one circumferential undercut continuous with said opening.

5. The torque converter cover of claim 3 wherein said recessed portion comprises a terminal end, said at least one circumferential undercut continuous with said terminal end.

6. The torque converter cover of claim 3 wherein said recessed portion comprises an opening and a terminal end, said at least one circumferential undercut located between said opening and said terminal end.

7. The torque converter cover of claim 1 wherein said protrusion comprises a height and said recessed portion comprises a depth, said height is greater than said depth.

8. The torque converter cover of claim 1 wherein said protrusion comprises a height and said recessed portion comprises a depth, said height is less than said depth.

9. A torque converter cover comprising:
a generally cylindrical protrusion extending from an outer surface of said torque converter cover and symmetrical about an axis of rotation for said cover; and,
a pilot boss comprising a generally cylindrical body having a generally cylindrical recessed portion comprising at least one circumferential undercut, said pilot boss matingly engaged with said protrusion.

10. A torque converter cover comprising:
a protrusion extending from an outer surface of said torque converter cover and symmetrical about an axis of rotation for said cover; and,
a pilot boss comprising a body having a recessed portion matingly engaged with said protrusion, wherein said protrusion is a frustum.

11. A torque converter cover for a torque converter containing a fluid comprising:
a first through hole arranged symmetrically about a first axis of rotation of said cover;
a pilot comprising an outer wall and a terminal end, said terminal end comprising a second through hole arranged symmetrically about a second axis of rotation of said pilot; and,
a fastener disposed within said first and second through holes operatively arranged to fixedly secure said pilot to said cover.

12. The torque converter cover of claim 11, wherein said pilot is generally cylindrical or generally frustoconical.

13. The torque converter cover of claim 11, wherein said fastener is a rivet.

14. The torque converter cover of claim 11, wherein said fastener is a bolt.

15. The torque converter cover of claim 11 further comprising at least one sealing means arranged to prevent egress of said fluid through said first or second through hole.

* * * * *